(12) United States Patent
Moore

(10) Patent No.: US 6,771,234 B2
(45) Date of Patent: *Aug. 3, 2004

(54) MEDIUM AND LARGE PIXEL MULTIPLE STRAND ARRAY STRUCTURE PLASMA DISPLAY

(76) Inventor: Chad Byron Moore, 7 W. 4$^{th}$ St., Corning, NY (US) 14830

( * ) Notice: Subject to any disclaimer, the term of this patent is extended or adjusted under 35 U.S.C. 154(b) by 249 days.

This patent is subject to a terminal disclaimer.

(21) Appl. No.: 09/797,280

(22) Filed: Mar. 1, 2001

(65) Prior Publication Data

US 2001/0033256 A1 Oct. 25, 2001

Related U.S. Application Data

(60) Provisional application No. 60/186,025, filed on Mar. 1, 2000.

(51) Int. Cl.$^7$ ................................................. G09G 3/28
(52) U.S. Cl. ...................... 345/60; 315/169.4; 315/167; 315/169.3; 313/485; 313/486; 313/487; 313/495; 313/496; 313/497; 313/499; 313/503; 313/506; 313/582; 313/584; 313/585; 313/586; 313/587
(58) Field of Search .................. 345/60; 315/169.3, 315/169.4, 167; 313/485, 486, 487, 495, 496, 497, 499, 503, 506, 582, 584, 585, 586, 587

(56) References Cited

U.S. PATENT DOCUMENTS 6,570,339 B1 * 5/2003 Moore ..................... 315/169.3

* cited by examiner

Primary Examiner—Richard Hjerpe
Assistant Examiner—Jean E Lesperance
(74) Attorney, Agent, or Firm—Brown & Michaels, PC

(57) ABSTRACT

The disclosure teaches using at least two orthogonal arrays of complicated shaped glass rods or very large fibers-like structures (from here in referred to as fibers) with wire electrodes to fabricate plasma displays with plasma cells larger than 0.05 mm$^3$ in volume. (The volume of a plasma cell is defined by the width of the plasma channel times the height of the plasma channel times the pitch of the pair of sustain electrodes.) To increase the size of the bottom fiber and keep the addressing voltage constant or to reduce the addressing voltage, the address electrode is moved from the bottom of the channel up into the barrier rib. Moving the address electrode up into the barrier rib will reduce the distance, d, between the address electrode and the sustain electrodes, thus increasing the electric field of the addressing pulse. To maintain a more uniform addressing field and build redundancy into the display an additional address electrode can be included in the barrier rib wall on the other side of the plasma channel.

45 Claims, 17 Drawing Sheets

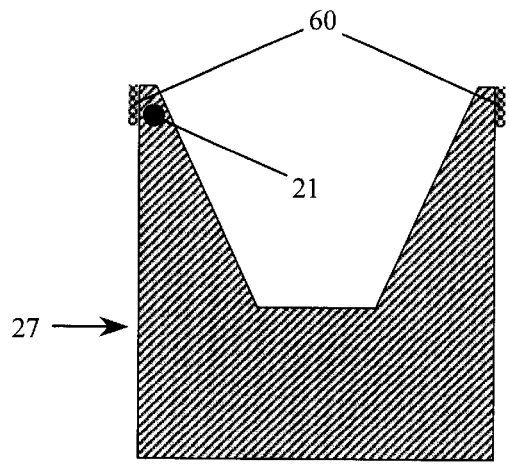
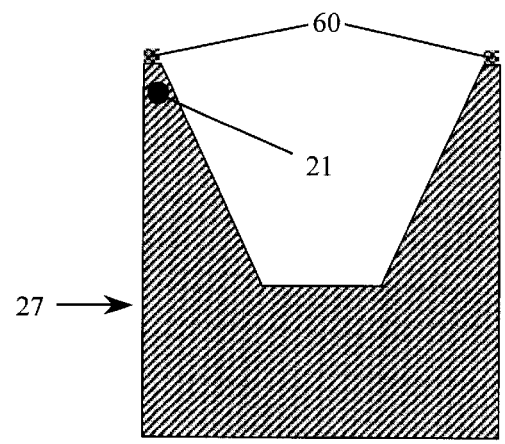
Figure 25a  Figure 25b
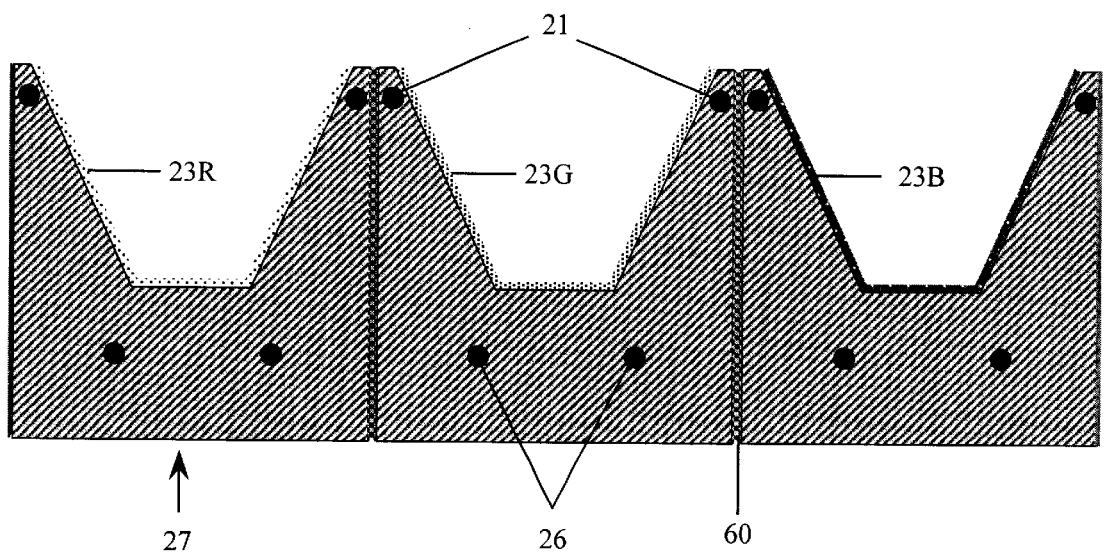
Figure 26

MEDIUM AND LARGE PIXEL MULTIPLE STRAND ARRAY STRUCTURE PLASMA DISPLAY

REFERENCE TO RELATED APPLICATIONS

This application claims an invention which was disclosed in Provisional Application No. 60/186,025, filed Mar. 1, 2000, entitled "MEDIUM AND LARGE PIXEL MULTIPLE STRAND ARRAY STRUCTURE PLASMA DISPLAY". The benefit under 35 USC § 119(e) of the United States provisional application is hereby claimed, and the aforementioned application is hereby incorporated herein by reference.

BACKGROUND OF THE INVENTION

1. Field of the Invention

The invention pertains to the field of plasma display panels. More particularly, the invention pertains to using glass structures, such as fiber, to construct a plasma display panel.

2. Description of Related Art

Plasma display panels (PDP) have been around for about 30 years, however they have not seen widespread commercial use. The main reasons are the short lifetime, low efficiency, and cost of the color plasma displays. Most of the performance issues were solved with the invention of the three electrode surface discharge AC plasma display (G. W. Dick, "Three-Electrode per PEL AC Plasma Display Panel", 1985 International Display Research Conf., pp. 45–50; U.S. Pat. Nos. 4,554,537, 4,728,864, 4,833,463, 5,086,297, 5,661,500, and 5,674,553). The new three electrode surface discharge structure, FIG. 1, advances many technical attributes of the display, but its complex manufacturing process and detailed structure makes manufacturing complicated and costly. The traditional method of manufacturing limits the display to small plasma cells (1 mm×0.3 mm×0.15 mm high) which will limit their applications to small displays (<80" diagonal). This limitation in plasma cell size will also limit the efficiency of the display because of the short firing distance (small if any positive column) and large surface area to volume ratio, which creates a lot of quenching of the plasma. (Note: The positive column in a plasma is the section where the number of electrons equals the number of ionized atoms. Fluorescent lights have a luminous efficiency of 80 lum/W, whereas when the positive column is shrunk down from 3 feet to 50 µm the luminous efficiency is reduced to around 1 lum/W.)

A number of methods have been proposed to create the structure in a plasma display, such as thin and thick film processing, photolithography, silk screening, sand blasting, and embossing. However, none of the structure forming techniques allows for the formation of medium (0.1 mm3 to 5 mm3) to large (5 mm3 and up) plasma cells. Several methods to produce the structure in a plasma display using fiber-like structures have been suggested and displays fabricated. Small hollow tubes were first used to create structure in a panel by W. Mayer, "Tubular AC Plasma Panels," 1972 IEEE Conf. Display Devices, Conf. Rec., New York, pp. 15–18, and R. Storm, "32-Inch Graphic Plasma Display Module," 1974 SID Int. Symposium, San Diego, pp. 122–123, and included in U.S. Pat. Nos. 3,964,050 and 4,027,188. These early applications where focused on using an array of gas filled hollow tubes to produce the rib structure in a PDP. In addition, this work focused on adding the electrode structure to the glass plates that sandwiched the gas filled hollow tubes.

Since this early investigation no further work was published on further developing a fiber or tube technology until that published by C. Moore and R. Schaeffler, "Fiber Plasma Display", SID '97 Digest, pp. 1055–1058. This work integrated the wire electrode(s) into glass fibers to produce the structure in a display, as shown in FIG. 2. A U.S. Pat. No. 5,984,747 GLASS STRUCTURES FOR INFORMATION DISPLAYS was granted covering this technology and is incorporated herein by reference. Using fibers to create the structure in the display will have problems when scaling to larger sizes because of the locations of the address and sustain electrode. A new structure will have to be invented to create the firing over longer distances and create a high enough electric field to address the display.

Another fiber-based plasma display patent application Ser. No. 09/299,370 FIBER-BASED PLAMSA DISPLAYS also covers many different techniques for manufacturing a plasma display, some of which will hold true no matter what the size and is incorporated herein by reference. The manufacturing of the plasma display covered under patent applications Ser. Nos. 09/299,350 and 09/299,371 entitled PROCESS FOR MAKING ARRAY OF FIBERS USED IN FIBER-BASED DISPLAYS and FRIT-SEALING PROCESS USED IN MAKING DISPLAYS will be capable of producing any multiple strand arrayed plasma display and are incorporated herein by reference.

SUMMARY OF THE INVENTION

The invention is to use at least two orthogonal arrays of complicated shaped glass rods or very large fibers-like structures (from here in referred to as fibers) with wire electrodes to fabricate plasma displays with plasma cells larger than 0.05 mm$^3$ in volume. (The volume of a plasma cell is defined by the width of the plasma channel times the height of the plasma channel times the pitch of the pair of sustain electrodes.) In order to fabricate working plasma displays the structure of the top and bottom fibers are modified from previously suggested displays.

By increasing the size of the fibers in the above mentioned patent application will create a very long addressing distance, d, in the bottom fiber. This addressing distance, d, in typical plasma displays and those discussed in the above patent and patent application are typically 100 µm to 150 µm. The addressing electrode is used to add to the total electric field in the plasma channel to ignite the plasma. As the distance d between the address electrode and sustain electrodes (located just above the top of the bottom fiber) is increased, by increasing the size of the bottom fiber, the electric field decreases, thus a larger voltage is required to address the plasma. To increase the size of the bottom fiber and keep the addressing voltage constant or to reduce the addressing voltage, the address electrode is moved from the bottom of the channel up into the barrier rib. Moving the address electrode up into the barrier rib will reduce the distance, d, between the address electrode and the sustain electrodes, thus increasing the electric field of the addressing pulse. To maintain a more uniform addressing field and build redundancy into the display an additional address electrode can be included in the barrier rib wall on the other side of the plasma channel.

BRIEF DESCRIPTION OF THE DRAWING

FIG. 25a schematically shows a cross-section of a bottom fiber with glass sealing frit attached to the top sides of the fiber.

FIG. 25b schematically shows a cross-section of a bottom fiber with glass sealing frit attached to the top of the barrier ribs.

FIG. 26 schematically shows three bottom fibers sealed together on their sides with a glass sealing frit.

DETAILED DESCRIPTION OF THE INVENTION

The invention is to use at least two orthogonal arrays of complicated shaped glass rods or very large fibers-like structures (from here in referred to as fibers) with wire electrodes to fabricate plasma displays with plasma cells larger than 0.05 mm³ in volume. (The volume of a plasma cell is defined by the width of the plasma channel times the height of the plasma channel times the pitch of the pair of sustain electrodes.)

Figure 1:
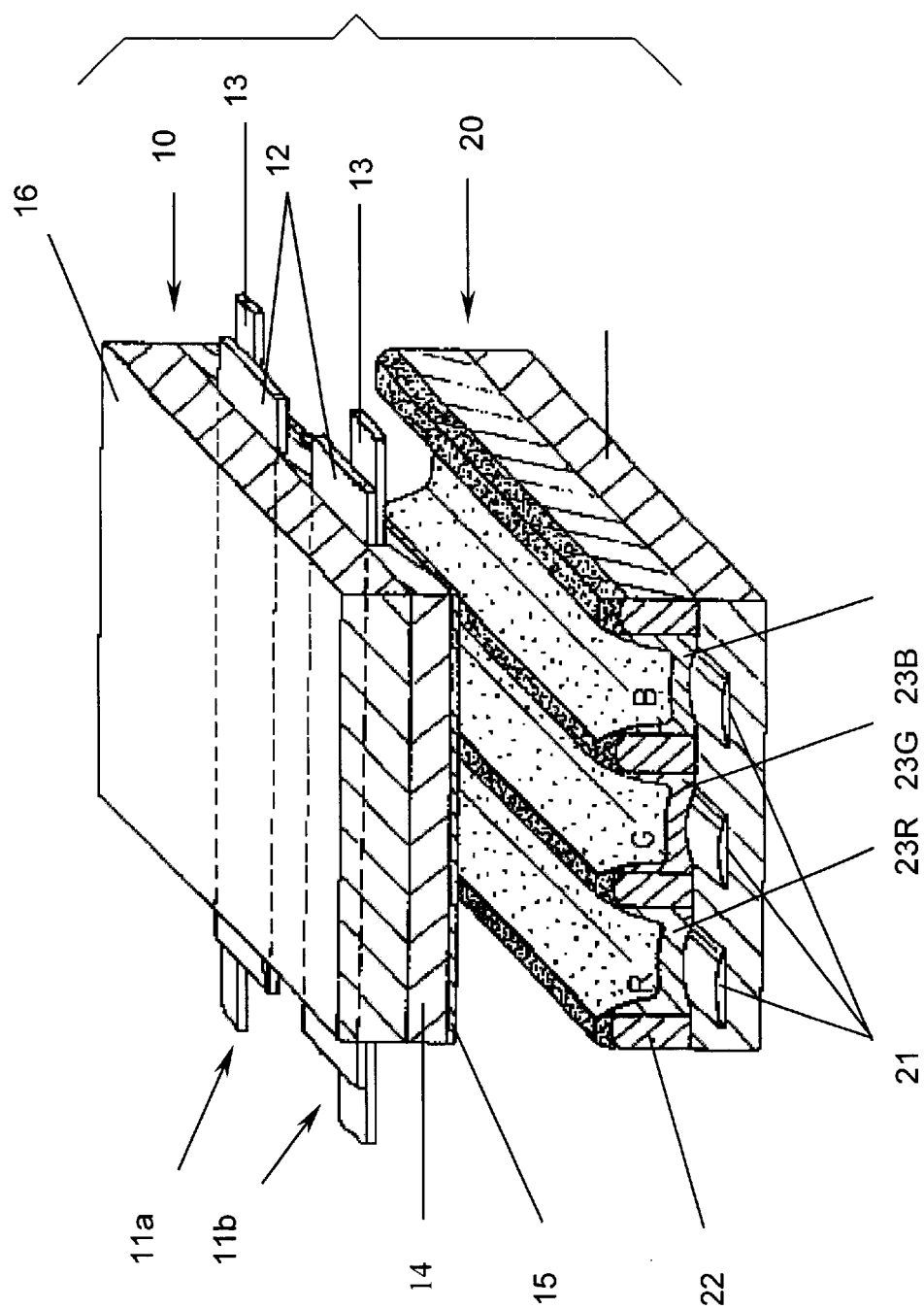
FIG. 1 illustrates a standard plasma display in accordance with the prior art.
Figure 2:
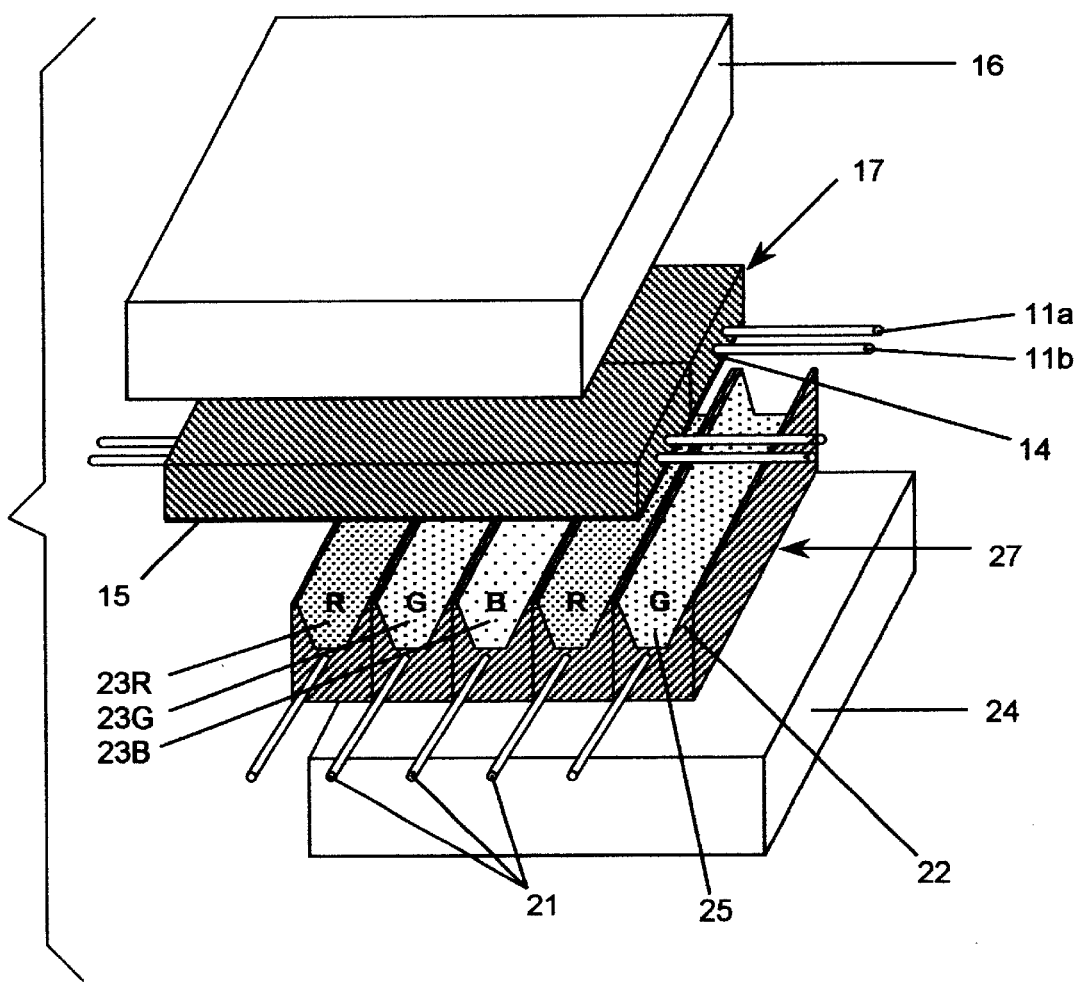
FIG. 2 illustrates a fiber-based plasma display with all functions of the display integrated into the fibers with embedded wire electrodes in accordance with the prior art.
Figure 3:
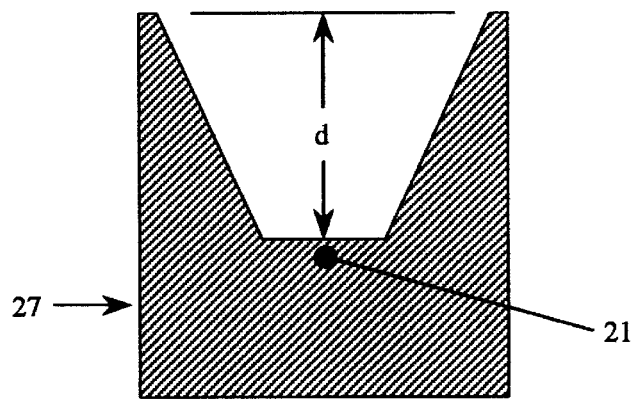
FIG. 3 schematically shows a cross-section of a bottom fiber depicting the addressing distance, d, between the address electrode and the sustain electrodes which would be located at the top of the channel.
Figure 4A:
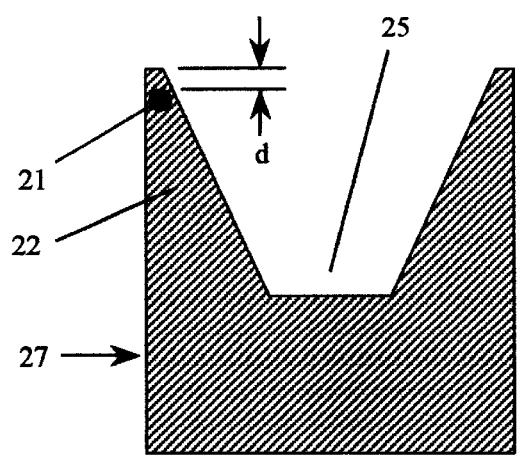
FIG. 4a schematically shows a cross-section of a bottom fiber where the address electrode is moved up into the wall of the barrier rib to reduce the distance between the address electrode and sustain electrodes, thus increasing the electric field of the addressing pulse.
Figure 4B:
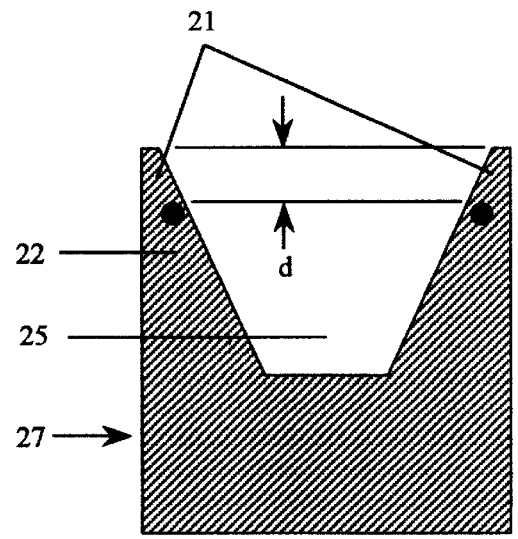
FIG. 4b schematically shows a cross-section of a bottom fiber where two address electrodes are located in the top of the walls of the barrier ribs to reduce the distance between the address electrodes and sustain electrodes, thus increasing the electric field of the addressing pulse.

In order to fabricate working plasma displays the structure of the top and bottom fibers disclosed in U.S. Pat. No. 5,984,747 and patent application Ser. No. 09/299,370 have to be modified. However, simply increasing the size of the fibers in the above mentioned patent application will create a very long addressing distance, d, in the bottom fiber 27, shown in FIG. 3. This addressing distance, d, in typical plasma displays and those discussed in the above patent and patent application are typically 100 $\mu$m to 150 $\mu$m. The addressing electrode 21 is used to add to the total electric field in the plasma channel to ignite the plasma. As the distance d between the address electrode 21 and sustain electrodes (located just above the top of the bottom fiber) is increased, by increasing the size of the bottom fiber 27, the electric field decreases, thus a larger voltage is required to address the plasma. To increase the size of the bottom fiber 27 and keep the addressing voltage constant or to reduce the addressing voltage, the address electrode 21 needs to be moved from the bottom of the channel 25 up into the barrier rib 22, as shown in FIG. 4a. Moving the address electrode 21 up into the barrier rib 22 will reduce the distance, d, between the address electrode 21 and the sustain electrodes 11, thus increasing the electric field of the addressing pulse. To maintain a more uniform addressing field and build redundancy into the display an additional address electrode 21 can be included in the barrier rib wall 22 on the other side of the plasma channel 25, shown in FIG. 4b.

Figure 5A:
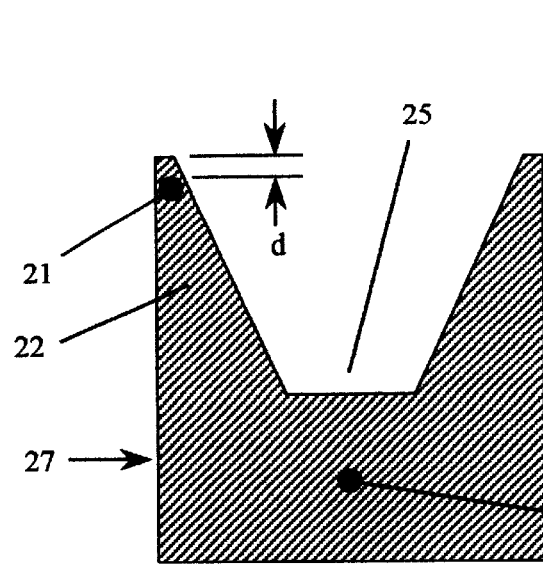
FIG. 5a schematically shows a cross-section of a bottom fiber where the address electrode is at the top of the barrier rib and an additional wire electrode is placed at the bottom of the plasma channel to define a lower plane and confine the electric field form the sustain electrodes. This electrode could also serve to block the EMF radiating out of the back of the display.
Figure 5B:
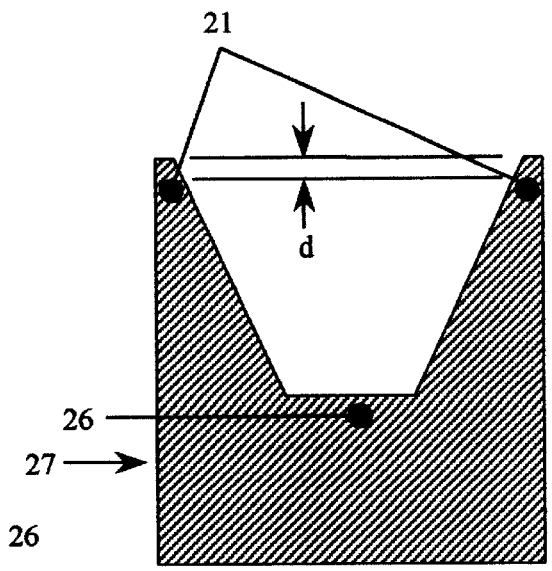
FIG. 5b schematically shows a cross-section of a bottom fiber where the address electrodes are at the top of the barrier ribs and an additional wire electrode is placed at the bottom of the plasma channel to define a lower plane and confine the electric field form the sustain electrodes. This electrode could also serve to block the EMF radiating out of the back of the display.
Figure 5C:
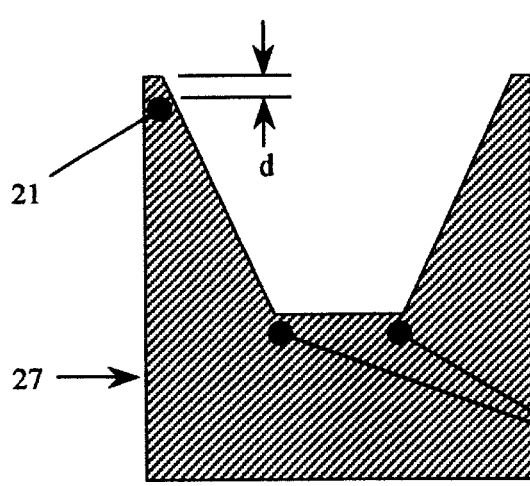
FIG. 5c schematically shows a cross-section of a bottom fiber where the address electrode is at the top of the barrier rib and two additional wire electrodes are placed at the bottom of the plasma channel to define a lower plane and confine the electric field form the sustain electrodes. These electrodes could also serve to block the EMF radiating out of the back of the display.
Figure 5D:
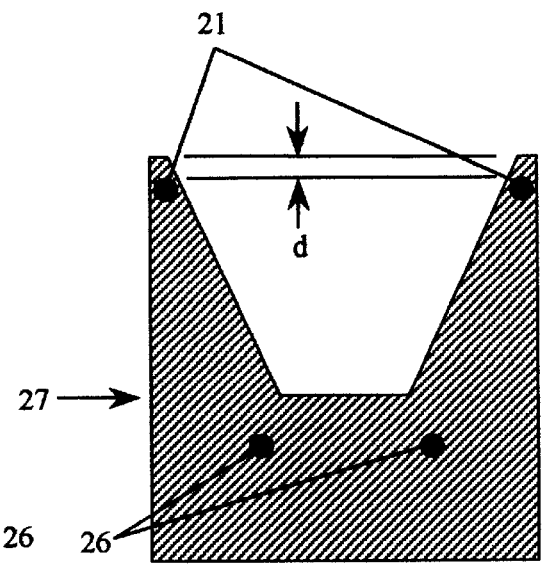
FIG. 5d schematically shows a cross-section of a bottom fiber where the address electrodes are at the top of the barrier ribs and two additional wire electrodes are placed at the bottom of the plasma channel to define a lower plane and confine the electric field form the sustain electrodes. These electrodes could also serve to block the EMF radiating out of the back of the display.

Moving the address electrode 21 up near the top of the barrier rib 22 will allow the electric field from the sustain electrodes to spread down into the plasma channel and there is no address electrode at the bottom of the channel to confine the field lines. The lack of a conductor at the bottom of the plasma channel will drastically increase the sustaining voltage. To define a lower plane for the electric field of the sustain electrodes a additional wire electrode, which we will call the field electrode 26 has to be added into the fiber below the channel or close to the bottom of the channel, as shown in FIGS. 5a–5d. FIG. 5a shows a single field electrode 26 directly below the plasma channel 25 with a single address electrode 21 located in the wall of the barrier rib. FIG. 5b shows a single field electrode 26 with two address electrodes 21, whereas FIGS. 5c and 5d schematically show two field electrodes 26 per bottom fiber 27 with one and two address electrodes 21, respectively. By adding field electrodes 26 to the bottom fiber 27 not only will bound the electric field from the sustain electrodes, but will also add a shield for electromotive force, EMF, escaping out of the back of the display.

Figure 6:
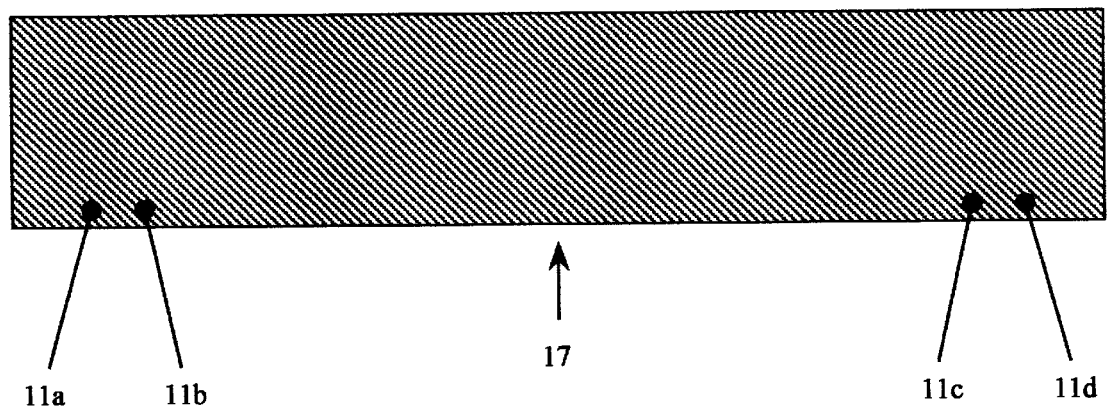
FIG. 6 schematically shows a cross-section of a top fiber with two sets of closely spaced electrodes separated by a larger distance used to pull the plasma during operation.
Figure 7:
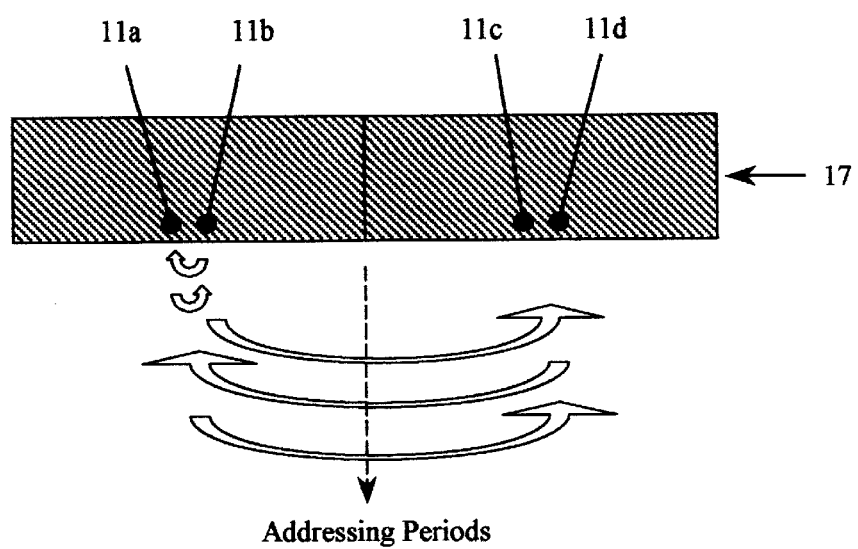
FIG. 7 schematically shows addressing in the four-electrode top fiber configuration.

Increasing the size of the plasma cell in the standard fiber-based plasma display not only required modifications of the bottom fiber in order to address the display, but also requires that the top fiber be modified in order to increase the size of the plasma glow and increase the efficiency of the display. Simply increasing the separation distance between the top sustain electrodes 11 to increase the size of the plasma glow will increase the firing voltage of the plasma. A longer firing distance between sustain electrodes is desired because longer firing distances usually results in higher efficiencies. For example, a fluorescent tube with a firing distance of about 4 feet has a luminous efficiency of about 80 lum/W, whereas a typical plasma display with a firing distance of only 100 $\mu$m only produces 1 lum/W. The reason for the increased efficiency is because positive column in a plasma display is much more efficient than the negative column. (The positive column is where the number of electrons is about equal to the number of ionized species, whereas in the negative column there are much more electrons and a much higher electric field). One method to retain a high pressure and fire the plasma over a long distance, to achieve a large positive glow, is to fire the plasma with a pair of closely spaced sustain electrodes 11a and 11b, then once charge is stored in the display use the stored charge to sustain the plasma over a much larger sustain electrode separation (11a–11b) to (11c–11d), as shown in FIGS. 6 and 7. This method of setting up the charge between two closely spaced electrodes then firing between a much wider separated electrode spacing will be referred to as pulling the plasma. FIG. 7 shows how the plasma is initial setup between the closely spaced electrodes 11a and 11b and then in the third firing cycle the charge is pulled to electrodes 11c and 11d. After the plasma is pulled through the large firing gap it continues to be sustained between electrodes (11a, 11b) and electrodes (11c, 11d).

Figure 8:
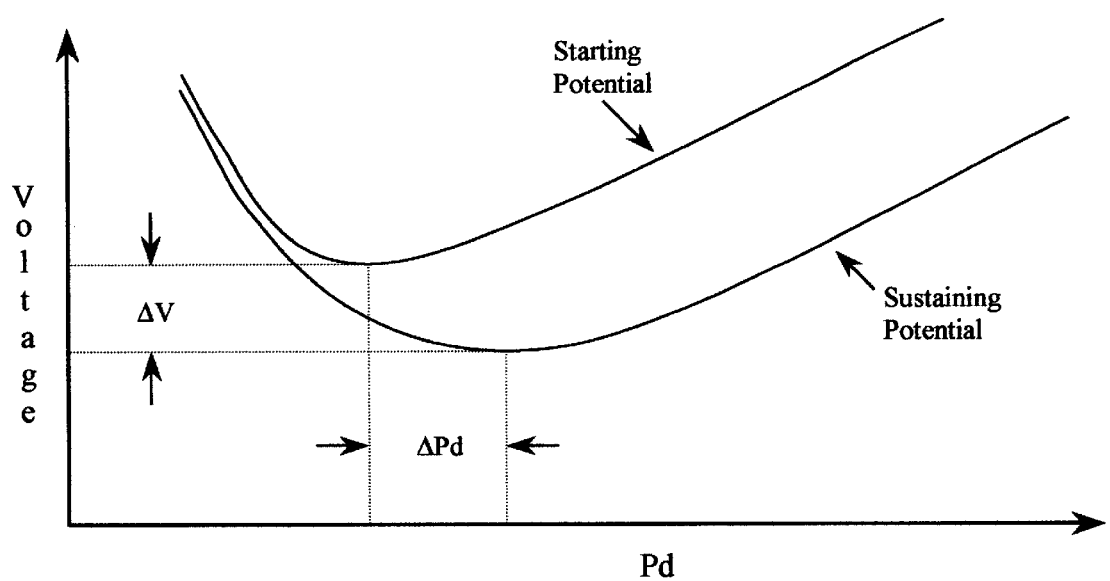
FIG. 8 is a Paschen curve, which represents the voltage potential as a function of reduced electrode distance, Pd, for both the starting potential and sustaining potential of a given gas.

The starting potential of a plasma versus a pressure, P, times electrode separation, d, which is know in the industry as a Paschen curve is shown in FIG. 8 for a given gas. A minimum in the starting potential against (Pd) appears for the following reason: the number of molecules in the gap is proportional to (Pd). At low P, the mean free path of an electron is large and few electrons can collide with gas molecules; most of them impinge on the anode and few ionizations take place. At large P, however, the mean free path of an electron is small and few electrons acquire sufficient energy over a mean free path to ionize. However, after the initial cell has been fired stored charge adds to the electric field in the next cycle of the AC, during the sustain period. This added electric field will tend to shift the sustaining potential versus (Pd) to higher values. To maintain the same mean free path length of the electron during sustaining the gap separation can be increased. The lowering of the voltage between the starting potential and sustaining potential is a result of both the added electric field from the stored charge and the initial ionization from this stored charge moving from one contact to the next. Thus using this shift in Pd the plasma can be addressed at one sustain electrode separation and sustained at a larger one.

Figure 9:
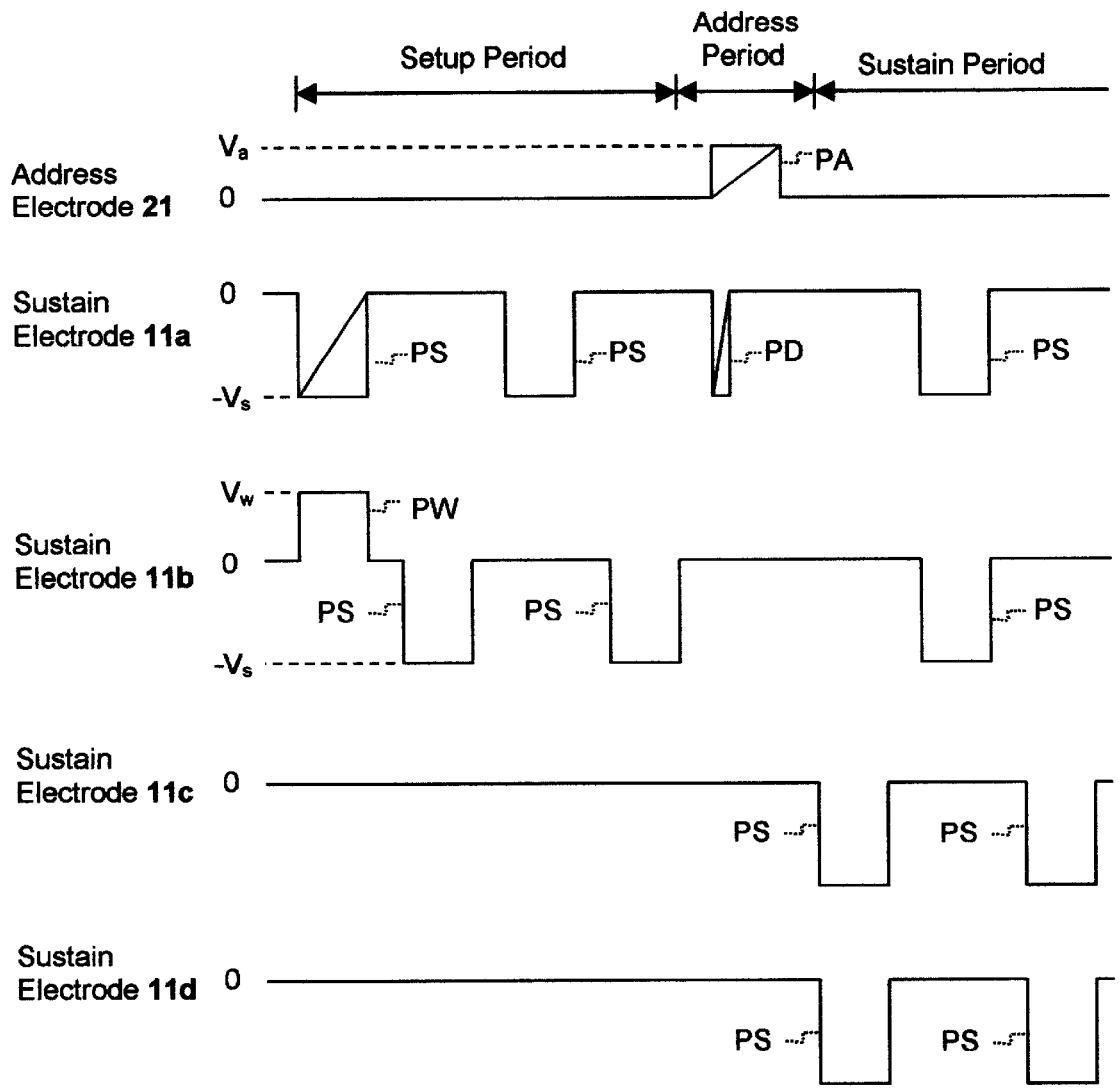
FIG. 9 shows the voltage waveforms for the erase address then pulled plasma sustain mode of operation.
Figure 10:
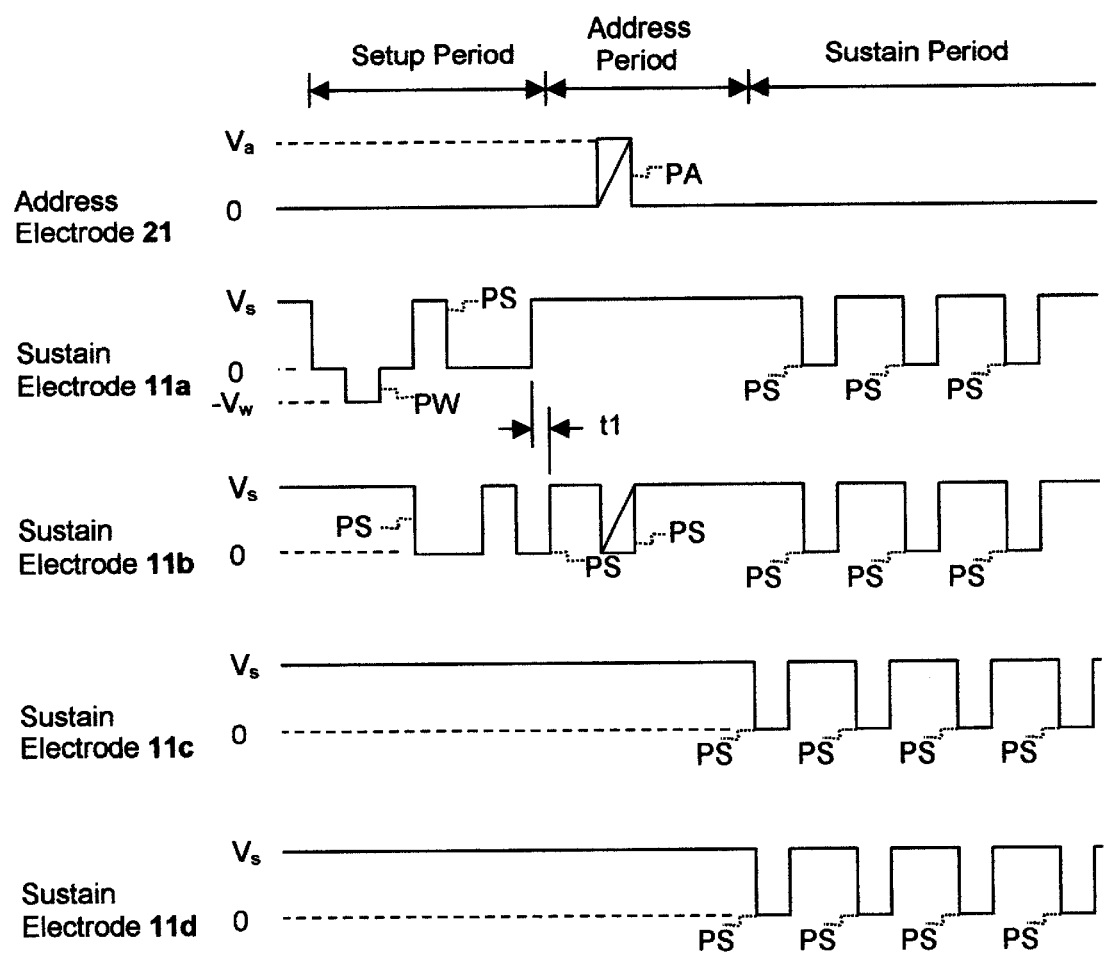
FIG. 10 shows the voltage waveforms for the write address then pulled plasma sustain mode of operation.
Figure 11:
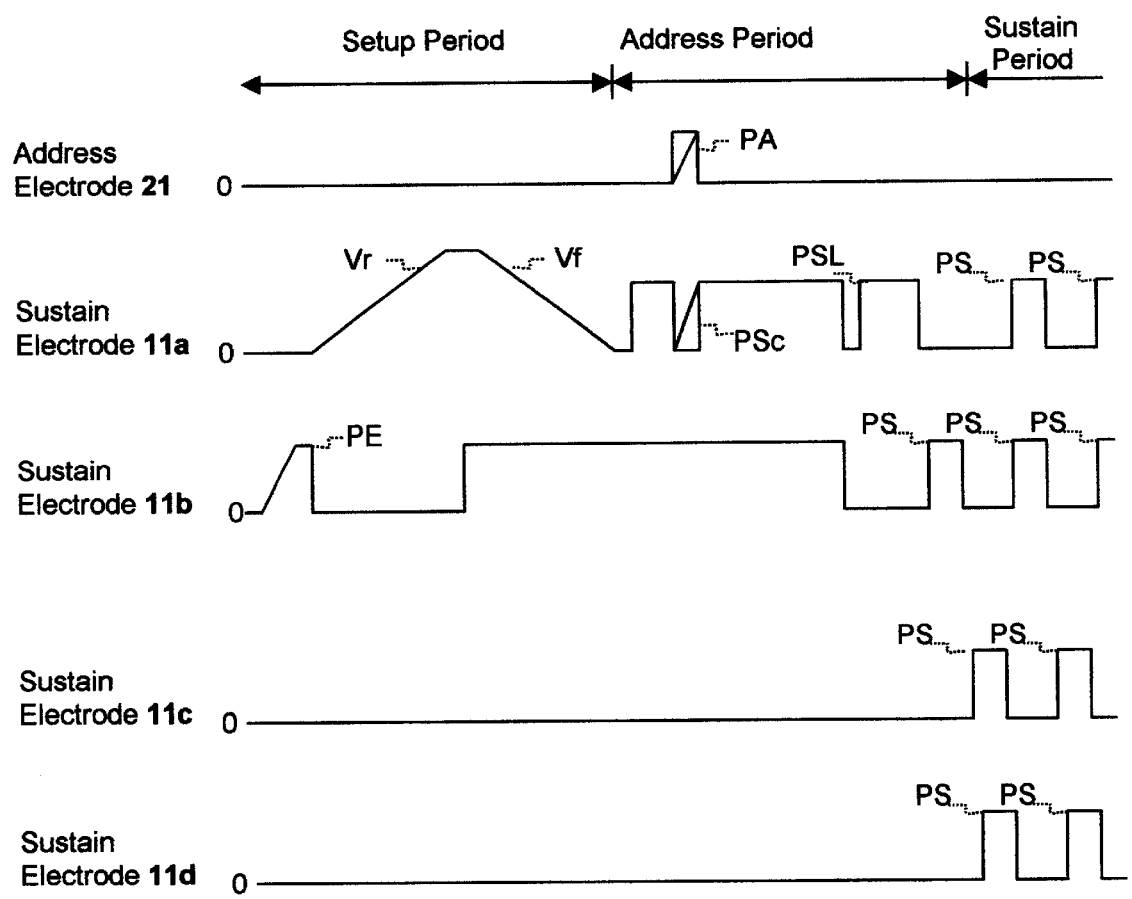
FIG. 11 shows the voltage waveforms for the ramped voltage address then pulled plasma sustain mode of operation.

FIGS. 9, 10, and 11 show three different waveforms for addressing the pulled plasma display erase address, write address and ramped voltage address, respectively. FIG. 9 shows the pulled plasma erase address waveforms. In the initial setup period in the display a discharge sustain pulse PS is applied to the display electrode 11a and simultaneously a writing pulse is applied to the display electrode 11b. The inclined line in the discharge sustain pulse PS indicates that it is selectively applied to lines. By this operation, all surface discharge cells are made to be in a written state. After the discharge sustain pulses PS are alternately applied to the display electrodes 11a and 11b to stabilize the written states, and at an end stage of the setup period, an erase pulse PD is applied to the display electrode 11a and a surface discharge occurs.

The erase pulse PD is short in pulse width, 1 $\mu$s to 2 $\mu$s. As a result, wall charges on a line as a unit are lost by the discharge caused by the erase pulse PD. However, by taking a timing with the erase pulse PD, a positive electric field control pulse PA having a wave height Va is applied to address electrodes 21 corresponding to unit luminescent pixel elements to be illuminated in the line.

In the unit luminescent pixel elements where the electric field control pulse PA is applied, the electric field due to the erase pulse PD is neutralized so that the surface discharge for erase is prevented and the wall charges necessary for display remain. More specifically, addressing is performed by a selective erase in which the written states of the surface discharge cells to be illuminated are kept.

In the sustain period following the address period, the discharge pulses PS are alternately applied to the display electrodes (11c, 11d) and (11a, 11b) to pull the plasma across the larger gap and illuminate the phosphor layers 23 with ultraviolet light. The display of an image is established by repeating the above operation for all lines in the display.

The pulled plasma waveforms for matrix write addressing are shown in FIG. 10. At the initial stage of the setup period, a writing pulse PW is applied to the display electrode 11a at the same time a sustain pulse is applied to display electrode 11b so as to make the potential thereof large enough to place each pixel element in the line in a write state. The write pulse PW is followed by two sustain pulses PS to condition the plasma cells. A narrow relative pulse of width t1 is then applied to each pixel element in the line to erase the wall charge. The narrow pulse is obtained by applying a voltage Vs on the sustain electrode 11a a time t1 before a voltage Vs is applied to sustain electrode 11b. In the display line, a discharge sustain pulse PS is selectively applied to the display electrode 11b and a selective discharge pulse PA is selectively applied to the address electrodes 21 corresponding to the unit luminescent pixel elements to be illuminated in the line depending on the image. By this procedure, opposite discharges between the address electrodes 21 and the display electrode 11b or selective discharges occur, so that the surface discharge cells corresponding to the unit luminescent pixel elements to be illuminated are placed into write states and the addressing finishes.

In the sustain period following the address period, discharge sustain pulses PS are alternately applied to the electrodes (11c, 11d) and (11a, 11b) to pull the plasma across the larger gap and illuminate the phosphor layers 23. The display of an image is established by repeating the above operation for all lines in the display.

The pulled plasma waveforms for the matrix ramped voltage addressing are shown in FIG. 11. During the setup period a voltage ramp PE is applied to the sustain electrode 11b which acts to erase any pixel sites which are in the ON state. After the initial erase a slowly rising ramp potential Vr is applied to the sustain electrode 11a then raised potential is applied to sustain electrode 11b and a falling potential Vf is applied to the sustain electrode 11a. The rising and falling voltages produces a controlled discharge causing the establishment of standardized wall potentials at each of the pixel sites along the sustain line. During the succeeding address pulse period, address data pulses PA are applied to selected column address lines 21 while sustain lines 11b are scanned PSc. This action causes selective setting of the wall charge states at pixel sites along a row in accordance with applied data pulses.

Thereafter, during the following sustain period an initial longer sustain pulse PSL is applied to the sustain electrode 11a to assure proper priming of the pixels in the written state. The following sustain period is composed of discharge sustain pulses PS alternately applied to the display electrodes (11c, 11d) and (11a, 11b) to pull the plasma across the larger gap and illuminate the phosphor layers 23. The display of an image is established by repeating the above operation for all lines in the display.

Figure 12:
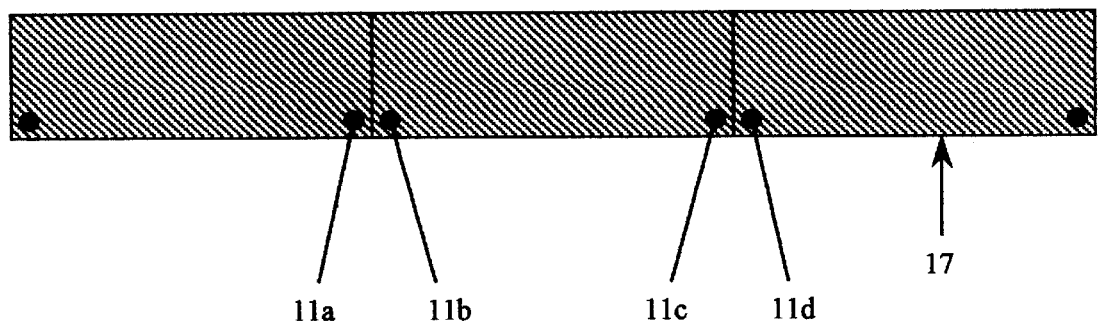
FIG. 12 schematically shows a cross-section of top fibers with two sets of closely spaced electrodes in adjacent fibers separated by a larger distance used to pull the plasma during operation.
Figure 13:
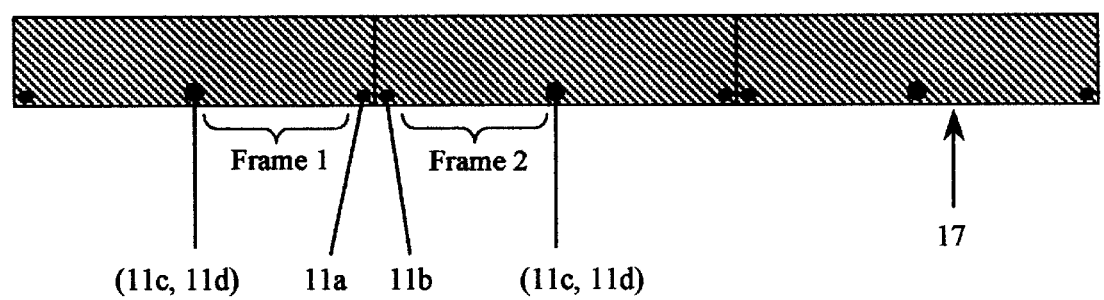
FIG. 13 schematically shows a cross-section of top fibers with a set of closely spaced electrodes in adjacent fibers separated by a larger distance between a single electrode on each side used to pull the plasma during interlaced addressing.

FIG. 12 schematically shows a cross-section of three top fibers 17 with wire electrodes 11a–11d in the corner of each fiber. The wire electrodes 11a and 11b in adjacent fibers are used to setup the charge in the plasma cell and wire electrodes 11c and 11d are used to pull and sustain the plasma in the displays similar to that discussed above. Note that wire electrodes 11c and 11d have the same voltage waveforms in FIGS. 9–11, thus could be combined as one electrode, as shown in FIG. 13. This wire electrode, as well as any other, could be larger to support the increased current per wire electrode. This type of electrode configuration would be most favorably addressed in an interlaced mode of operation. In the interlaced mode of addressing every other pixel element is addressed and sustained in the first video frame and in the second video frame the remaining pixels are addressed and sustained. This interlaced addressing will both allow for plasma coverage of the entire surface without allowing the charge to spread to the nearby electrode structure, hence a misaddressing of the plasma. All of the top electrode structures could be addressed in an interlaced mode of operation.

Figure 14:
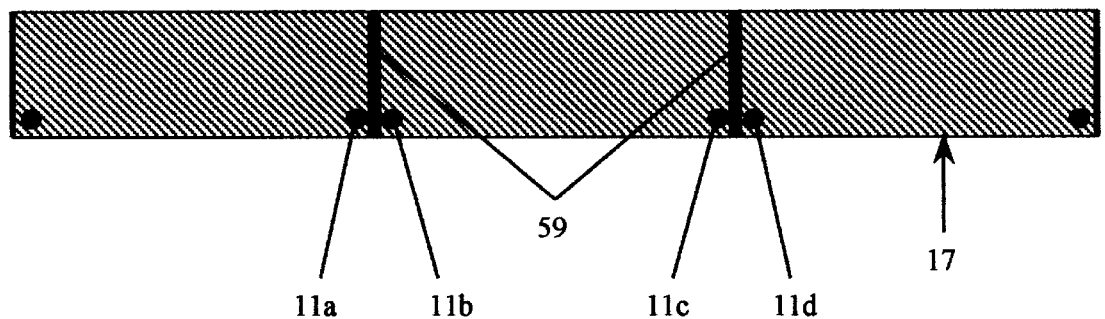
FIG. 14 schematically shows a cross-section of top fibers with two sets of closely spaced electrodes in adjacent fibers with a built in black matrix between the electrodes separated by a larger distance used to pull the plasma during operation.

The plasma created during the initial addressing period in the plasma pulling mode of operation will generate some light between wire electrodes 11a and 11b. This light acts as a background illumination and decreases the contrast ratio in the dark. To reduce the amount of background light reaching the viewer's eye, a black matrix 59 can be built into the fibers 17 between wire electrodes 11a and 11b, as shown in FIG. 14. This black matrix 59 can be simply added to the sides of the glass fibers as a glass frit as the fibers are being sealed together or could be added into the glass fiber itself. Adding about 1% to 5% Cobalt into most glass compositions is usually sufficient to add enough dark color to the glass to serve as a black matrix 59.

Figure 15:
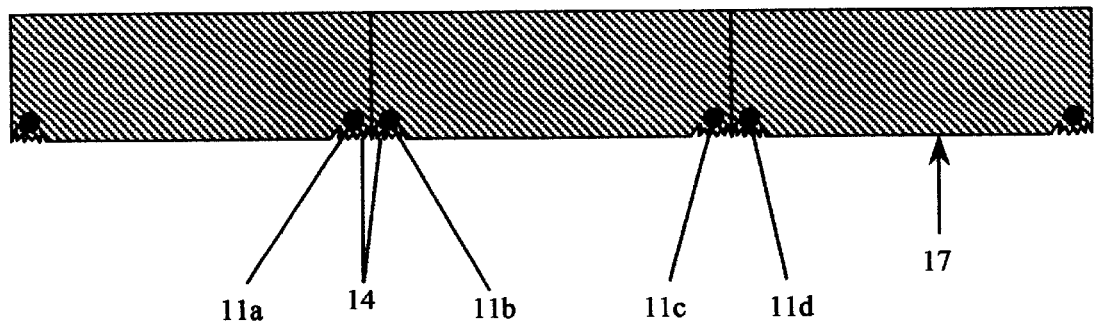
FIG. 15 schematically shows a cross-section of top fibers with two sets of closely spaced electrodes in adjacent fibers separated by a larger distance used to pull the plasma during operation. The area around the wire electrodes is textured to enhance the electric field.

FIG. 15 shows a textured surface 14 around the wire sustain electrodes 11. The textured surface 14 is composed of sharp edges that will enhance the electric field, hence lowing the voltage during addressing and sustaining. The textured surface 14 could be designed into the surface of the glass fiber 17 or added as a coating after or during fiber draw. The textured surface 14 would also yield more surface area around the wire sustain electrodes 11. This increased surface area would allow for more charge to be stored around the sustain electrodes 11, hence making it easier to address and sustain the plasma.

Figure 16:
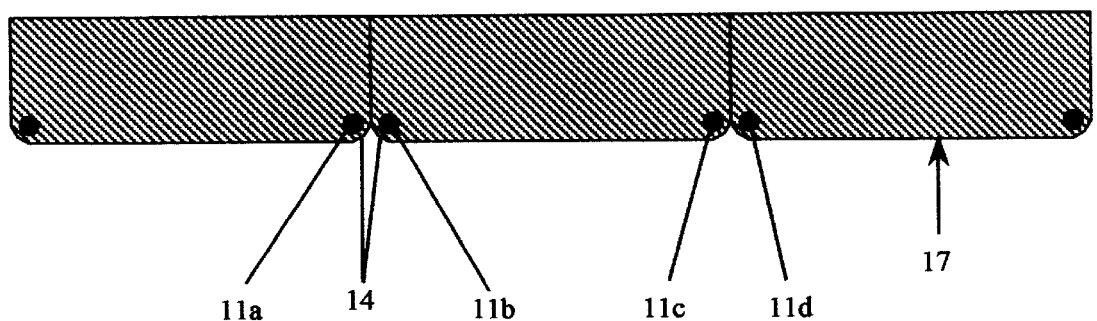
FIG. 16 schematically shows a cross-section of top fibers with two sets of closely spaced electrodes in adjacent fibers separated by a larger distance used to pull the plasma during operation. The area around the wire electrodes is curved to create a uniform electric field.

The electric field between sustain electrodes 11a and 11b could be enhanced by adding texture 14 to the surface of the fiber 17. Rounding off the ends of the top fibers 17 will leave a gap between sustain electrodes 11a and 11b, as shown in FIG. 16. Because the largest electric field is directly between two electrodes, removing the glass dielectric between the wire sustain electrodes 11a and 11b will drastically increase the ability to breakdown the gas and address the display. This glass removal between sustain electrodes 11a and 11b could also be combined with texturing 14 the surface of the fiber 17, as in FIG. 15, to lower the initial writing voltages. It is a concern that not to much glass is removed between sustain electrodes 11a and 11b, because of the potential of charge transfer from one plasma cell to the next over the barrier ribs. A solution to reduce this probability of charge transfer is discussed below, however, if the gap between sustain electrodes is small (around 100 $\mu$m) then the electric field is strong and the charge carriers mainly move in one direction toward the electrodes. Since the charge carriers (electrons and ionized species) have a large directional motion toward the electrodes there should be little spreading of the charge along the length of the top fiber 17 over the barrier ribs.

Figure 17:
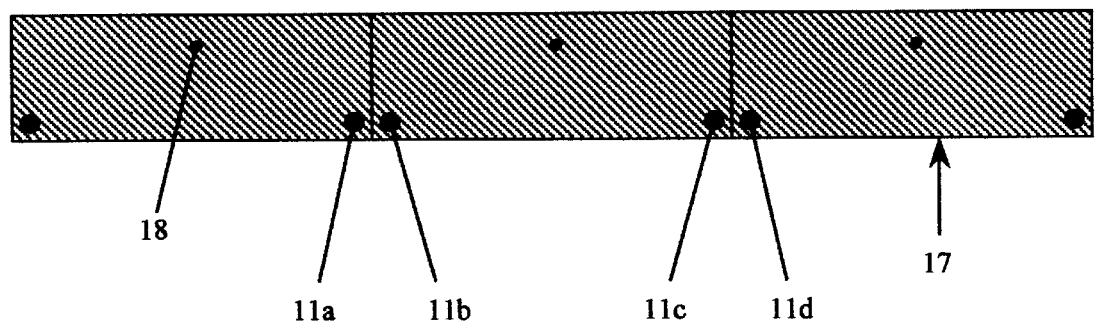
FIG. 17 schematically shows a cross-section of top fibers with additional wire electrodes to assist in directing the electric field out of the fiber and into the plasma region.
Figure 18:
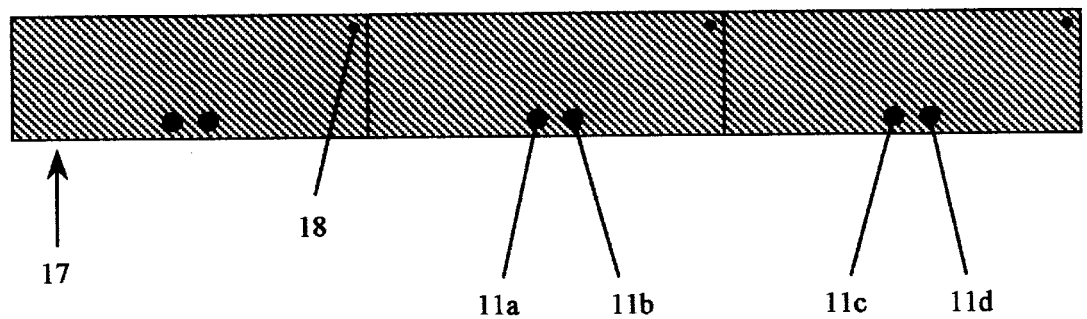
FIG. 18 schematically shows a cross-section of top fibers with additional wire electrodes to assist in directing the electric field out of the fiber and into the plasma region.
Figure 19:
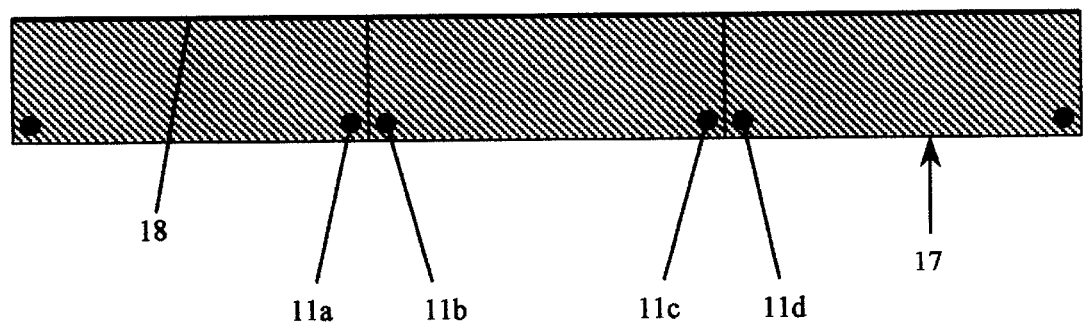
FIG. 19 schematically shows a cross-section of top fibers with a transparent electrode on or near its top surface to assist in directing the electric field out of the fiber and into the plasma region.

The electric field spreading into the top fibers could be reduced, similar to that shown in FIG. 5 for the bottom fiber, by adding an additional wire electrode 18 into the top fibers 17, as shown in FIGS. 17 and 18. This additional field wire electrodes 18 will serve to add an electrical retardation plane for spreading electric field lines spreading up through the top of the top fiber 17. The field electrodes 18 will retard the electric field, hence creating the highest potential below the top fibers 17, which is in the plasma region. The retardation electrode could also be added to the top of the fiber as a transparent conductive thin film 18, as shown in FIG. 19. This transparent field electrode 18 could also be added to the bottom of the top cover glass, which would locate it close to the top of the top fiber 17. This field electrode 18 could also add a shield for electromotive force, EMF, escaping out of the front of the display.

Figure 20:
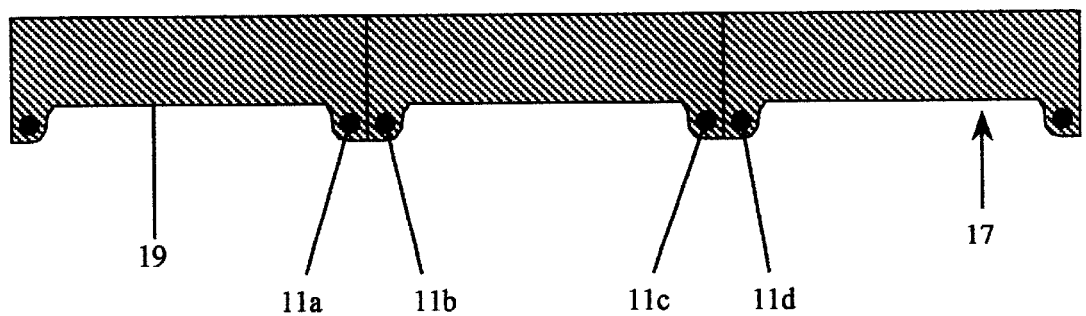
FIG. 20 schematically shows a cross-section of top fibers with two sets of closely spaced electrodes in adjacent fibers separated by a larger distance used to pull the plasma during operation. The electrode sets are raise from the fibers to enhance the electrode field during pulling of the plasma.
Figure 21:
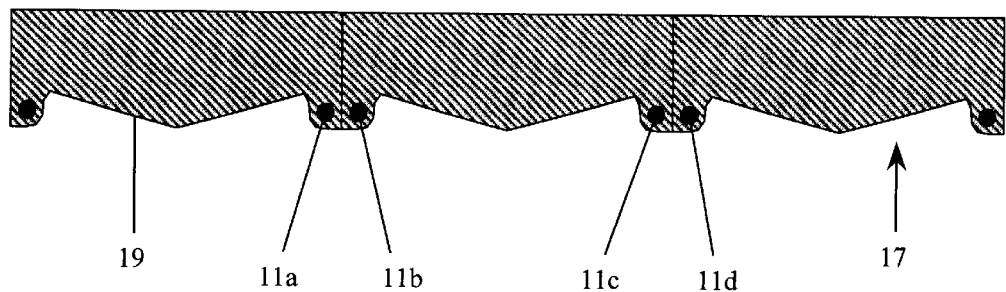
FIG. 21 schematically shows a cross-section of top fibers with two sets of closely spaced electrodes in adjacent fibers separated by a larger distance used to pull the plasma during operation. The electrode sets are raise from the fibers to enhance the electrode field during pulling of the plasma with a V-shaped center to keep the plasma from spreading over the barrier ribs.

Similar to that shown in FIG. 16, the electric field between sustain electrode pairs (11a, 11b) and (11c, 11d) could be enhanced by removing some of the glass dielectric 19 between the electrode pairs, as shown in FIG. 20. Since the highest electric field is directly between the electrodes removing the glass in this region 19 will allow the plasma gas to reside in this region 19. However, the larger electrode separation will create a positive glow region where the charged particles have a larger mean free path along the length of the wire sustain electrodes. Therefore, there is a much higher probability of the charge to spread over the barrier ribs 22 and along the length of the sustain electrodes 11. To reduce the probability of charge spreading over the barrier ribs 22 the center of the top fiber 19 could be designed to extend down to the top of the barrier ribs to force the charged carriers to flow down below the top fiber 17, as shown in FIG. 21.

Figure 22:
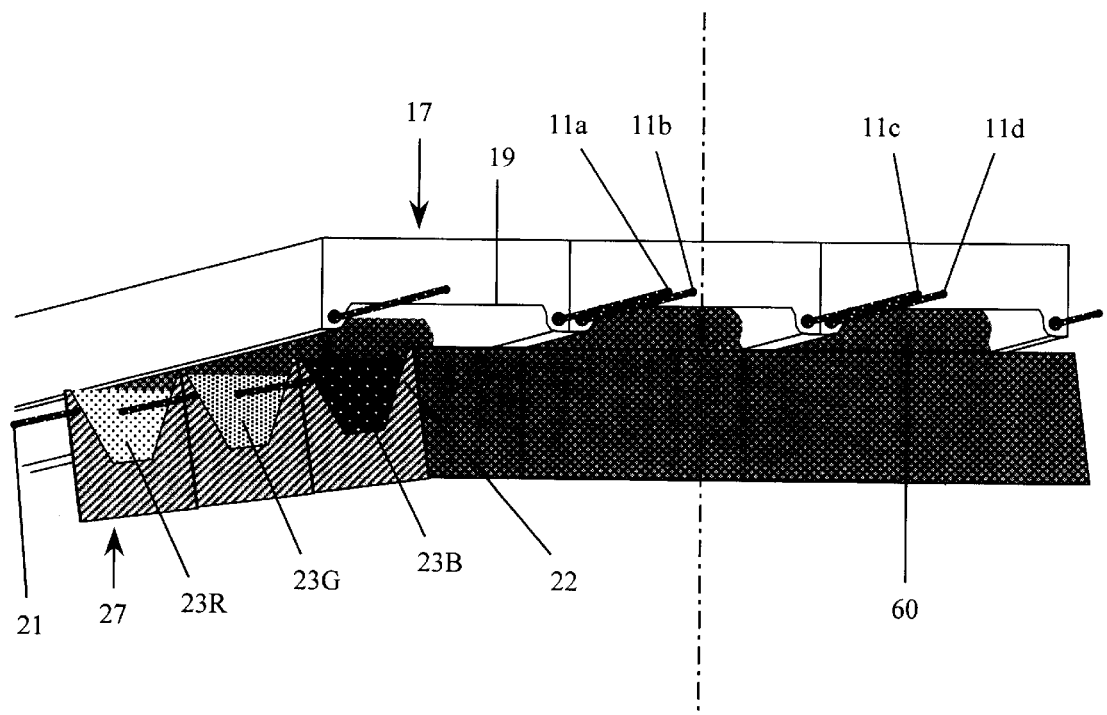
FIG. 22 schematically shows a large fiber pulled plasma display with a grooved top fiber, which is periodically filled with glass frit at the top of the bottom fiber's barrier ribs.
Figure 23:
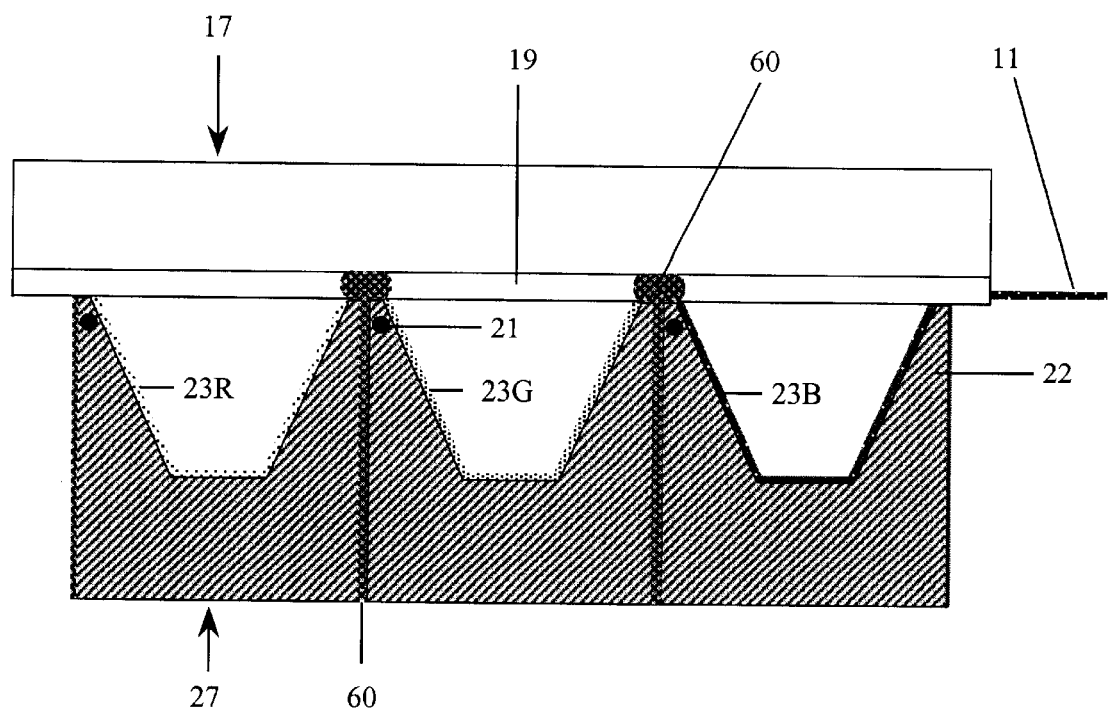
FIG. 23 is a cross-section taken from FIG. 22.
Figure 24:
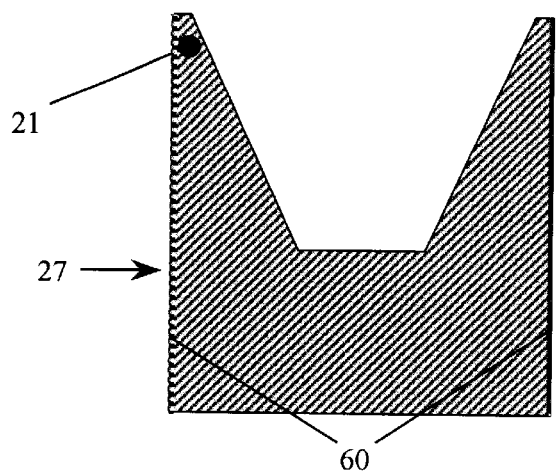
FIG. 24 schematically shows a cross-section of a bottom fiber with glass sealing frit attached to the sides of the fiber.

The most effective method of stopping the plasma from spreading over the top of the barrier ribs 22 in a grooved 19 top fiber 17 is to add frit 60 to the bottom fibers 27 and have it flow up against the top fibers during the frit seal process step. FIG. 22 schematically shows a top 17 and bottom 27 fiber array assembled where the frit 60 flows between the fibers and fills the gap between the top of the barrier ribs 22 and the grooved 19 top fiber 17. FIG. 23 is a cross section taken from FIG. 22. Note that the frit flows over the top of the barrier ribs 22 and into the grooved region 19 in the top fibers 17. FIGS. 24 and 25 show different configurations of bottom fiber 27 with glass frit 60. In FIG. 24 the glass frit 60 is evenly applied to both sides of the bottom fiber 27. FIG. 25a shows the glass frit 60 only applied to the top of the bottom fiber 27, hence upon sealing of the plasma panel force will have to be applied to the sides of the fibers 27 to push them together and force the frit to flow. FIG. 25b shows the glass frit 60 placed on the top of the barrier ribs 22, thus during sealing the frit will flow since the panel is clamped together.

FIG. 26 shows an array of bottom fibers 27 frit sealed 60 together to form a gas tight bottom fiber structure. Therefore, no bottom glass plate is necessary and a much lighter plasma display can be fabricated. Similar top fiber sealing could be preformed to remove the need of a top glass plate.

Figure 27:
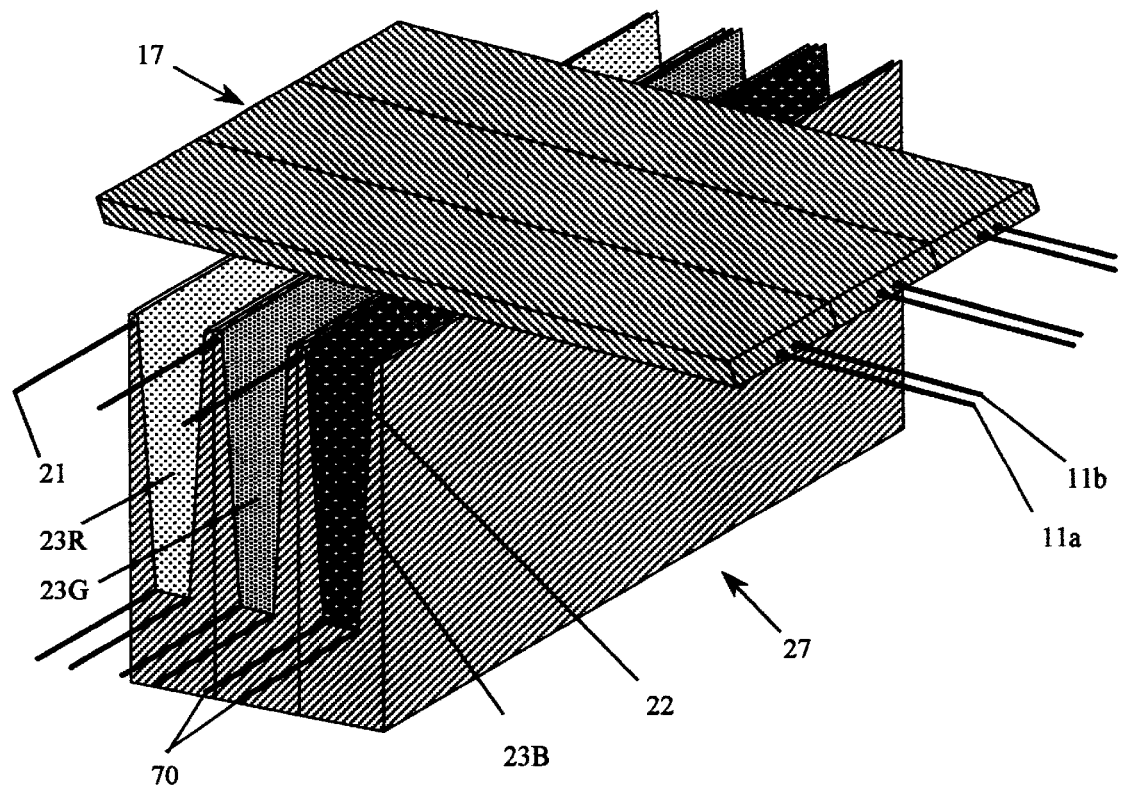
FIG. 27 schematically shows a plasma display with a long positive glow region formed by pulling electrons through the gas to a third set of electrodes.

FIG. 27 schematically shows a plasma display formed using two orthogonal fiber arrays similar to that discussed above. However, in this display the bottom fiber 27 has very long plasma channels coated with phosphor layers 23 with anode electrodes 70 at the bottom of the channel and address electrodes 21 in the top of the barrier ribs 22. The display operates similar to a standard surface discharge display with sustain electrodes 11a and 11b and address electrode 21. However, the anode electrode(s) 70 at the bottom of the channel has a constant positive voltage to draw the free electrons generated from the surface discharge plasma through the long plasma channel, hence creating a long positive glow region. In addition the positive voltage applied to the anode electrodes 70 can be applied in an alternating fashion between the two electrodes. The long positive glow region should have a small voltage drop where the number of electrons is about equal to the number of ionized species, hence generating an efficient plasma glow. The wire anode electrodes 70 can be designed to be open to the plasma channel to more easily bleed off the charge of the electrons. The electrodes can be exposed to the plasma using a lost glass process similar to that disclosed in patent application Ser. No. 09/299,394 LOST GLASS PROCESS USED IN MAKING FIBER-BASED DISPLAY. The high aspect ratio plasma channel can also be fabricated using the lost glass process disclosed in the above patent application. To increase the amount of electrons flowing through the system to the anode electrode either the address electrode or at least one of the sustain electrodes will also have to be exposed to the plasma. Unless the display is interlace addressed with respect to the color subpixel bottom electrodes such that charge can flow from the adjacent anode electrode 70 over the barrier rib and down through the addressed plasma channel to create ionization.

Figure 28:
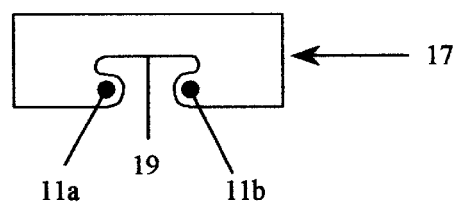
FIG. 28 schematic cross-section of the top fiber shown in FIG. 27, which will resist the priming charge getting stolen to the anode electrode.
Figure 29:
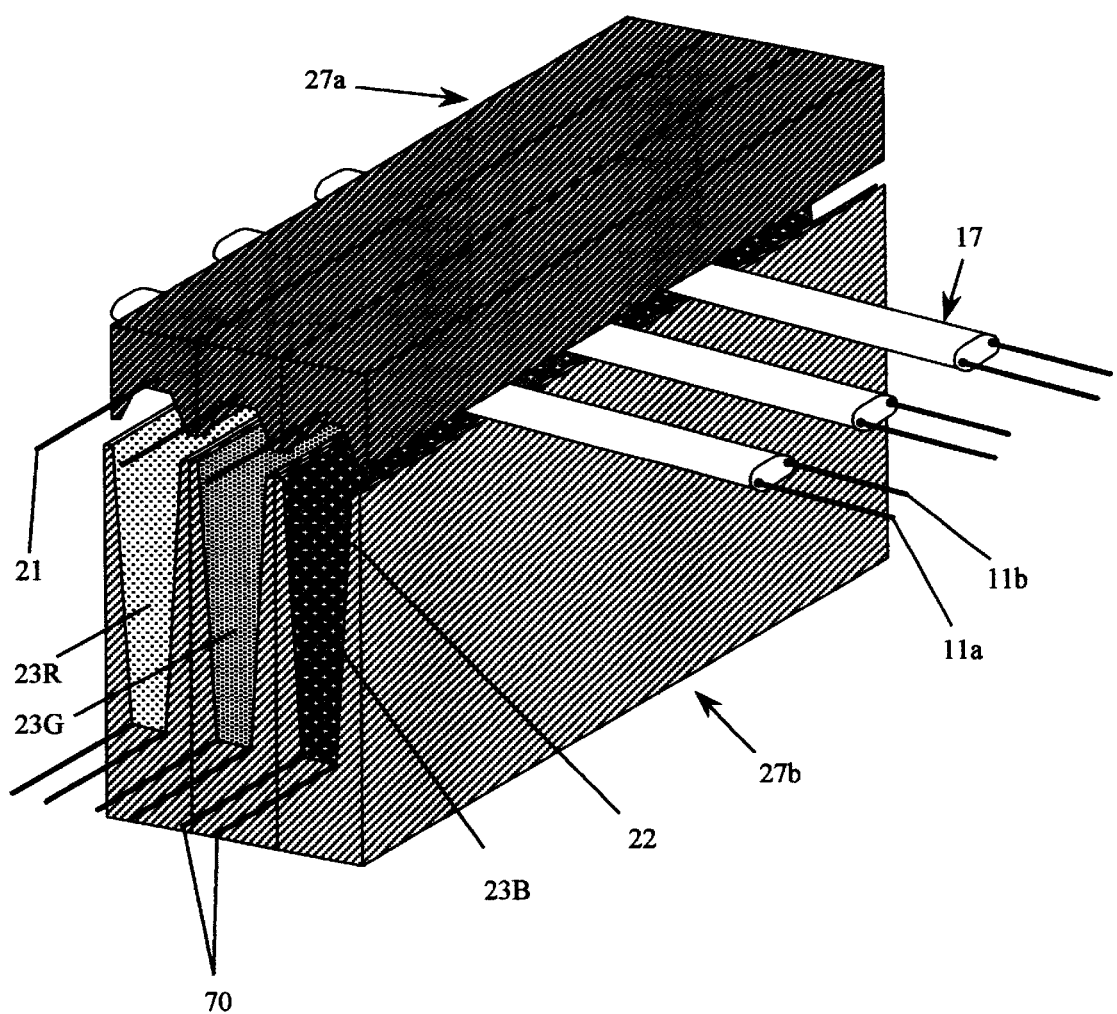
FIG. 29 schematically shows a plasma display formed using three fiber arrays with a long positive glow region formed by pulling electrons through the gas to a third set of electrodes.

One potential problem when addressing the display in FIG. 27 is loosing the charge on the sustain electrode. The electrons that "plate out" on the bottom of the top fiber 17 may tend to be lost due to the positive voltage on the anode electrodes 70. To ensure that the priming electrons stay on the top fiber it needs to be located such that it is not in direct line of sight with the anode electrode 70 at the bottom of the plasma channel. There are two possible solutions to this problem of loosing the stored charge. One is to add shape 19 to the top fiber 17, similar to that shown in FIG. 28, such that the potential created by the anode electrode 70 does not have a direct line of sight to strip the electron. A second method is to design a three-fiber-array display where the priming electrons can reside on the top of the top fiber array 17, as shown in FIG. 29. In the three-fiber-array display the bottom fiber array 27 is divided into two fiber arrays 27a and 27b. Both bottom fibers have a build in channel, where bottom fiber 27a contains the address electrode and is used to address the plasma display and bottom fiber 27b contains the anode electrode(s) 70 and phosphor layer for light generation. The channel in bottom fiber 27a will create a plasma cell and allow the display to be addressed and the electrons migrating between the top fibers 17 will be drawn toward the anode electrode 70 creating ionization. The priming charge created during addressing the display will reside on the top of the top fiber hence being shielded from the anode electrode 70 potential. In this three-fiber-array display it would be advantageous to have both the anode electrodes 70 and address electrodes 21 exposed to the plasma so that more electrons can flow through the plasma channel per voltage cycle.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A fiber-based plasma display comprising:
   at least two orthogonal arrays of fiber-like structures;
   at least one fiber such that said fiber makes up said fiber-like structures; and at least one wire electrode within said fiber such that said electrode creates a plurality of plasma cells with a volume greater than 0.05 mm$^3$;

wherein at least one address electrode is located in a barrier rib region of the fiber to reduce an addressing distance between the address electrode and at least one sustain electrode.

2. A fiber-based plasma display of claim 1, further comprising at least one field electrode located below a plasma channel to retard the electric field created by at least one sustain electrode and to repel said electric field to reside within a plasma cell region.

3. A fiber-based plasma display of claim 2, wherein said field electrode also serves to shield an electromotive force escaping out of a back of the display.

4. A fiber-based plasma display of claim 1, wherein a colorant is added to said fiber creating an absorbing section in said fiber creating a black matrix function.

5. A fiber-based plasma display of claim 4, wherein said black matrix is formed by adding a coloring ingredient into said glass, such as Cobalt.

6. A fiber-based plasma display of claim 4, wherein said black matrix is formed using a dark glass sealing frit material.

7. A fiber-based plasma display of claim 1, wherein the surface of said fiber is contoured to enhance the electric field from said wire electrode.

8. A fiber-based plasma display of claim 1, wherein a thin dielectric layer separating said wire electrode form said surface is textured around at least one wire electrode to enhance the electric field in said textured region.

9. A fiber-based plasma display of claim 1, further comprising adding at least one field electrode to said fiber to retard the electric field created by applying a voltage to said wire electrode and confine it to said plasma cell region.

10. A fiber-based plasma display of claim 9, wherein said field electrode is a transparent conductive film deposited on the surface of said fiber.

11. A fiber-based plasma display of claim 1, where the fibers in at least one fiber array is frit sealed together such that a cover glass is not needed to form the vacuum tight seal on the outside surface of said at least one fiber array.

12. A fiber-based plasma display of claim 1, further comprising sandwiching said two orthogonal fiber arrays of fiber-like structures between two glass plates to form a rigid panel structure.

13. A fiber-based plasma display of claim 12, further comprising adding a transparent conductive film deposited on the surface of at least one glass plate to assist in confining the electric field from said wire electrodes to said plasma cell region.

14. A fiber-based plasma display of claim 12, further comprising adding a transparent conductive film deposited on the surface of at least one glass plate to serves to shield an electromotive force escaping out of the display.

15. A fiber-based plasma display of claim 1, further comprising adding a glass frit to the surface of said at least one fiber to create a closed plasma cell channel.

16. A fiber-based plasma display of claim 1, further comprising a pair of closely spaced wire sustain electrodes and at least one other wider spaced wire sustain electrode.

17. A fiber-based plasma display of claim 16, where a plasma is ignited between said closely spaced wire sustain electrodes and then some of the electrons from said plasma are pulled through the long plasma cell region to said at least one other wider spaced wire sustain electrodes to create a long plasma path similar to that experienced in a positive glow region.

18. A fiber-based plasma display according to claim 16, further comprising an erase address drive control system, wherein said erase address control system comprises:

means for storing charge at each plasma cell to turn each pixel ON;

means for selectively removing said charge from at least one pixel by applying an erase pulse to its corresponding top fiber closely spaced sustain electrodes and corresponding bottom fiber wire electrode, thereby turning said at least one pixel OFF; and means for sustaining the ON pixels by alternatively applying voltage pulses between said far spaced sustain electrode(s) and closely spaced sustain electrodes, thereby creating light in said display.

19. A fiber-based plasma display according to claim 16, further comprising a ramped voltage address drive control system, wherein said ramped voltage address drive control system comprises:

means for turning each pixel ON by applying at least one voltage ramp to said top fiber closely spaced wire electrodes to create a standardized charge at each pixel;

means for selectively removing said charge from at least one pixel by applying an erase pulse to its corresponding top fiber closely spaced sustain electrodes and corresponding bottom fiber wire electrode, thereby turning said at least one pixel OFF; and means for sustaining the ON pixels by alternatively applying voltage pulses between said far spaced sustain electrode(s) and closely spaced sustain electrodes, thereby creating light in said display.

20. A fiber-based plasma display according to claim 16, further comprising a write address drive control system, wherein said write address control system includes:

means for removing charge at each pixel, thereby turning each pixel OFF;

means for selectively adding charge to at least one pixel by applying a voltage to its corresponding closely spaced sustain electrodes in the top fiber and corresponding bottom fiber wire electrode, thereby turning said at least one pixel ON; and means for sustaining the ON pixels by alternatively applying voltage pulses between said far spaced sustain electrode(s) and closely spaced sustain electrodes, thereby creating light in said display.

21. A fiber-based plasma display according to claim 16, further comprising a ramped voltage address drive control system, wherein said ramped voltage address drive control system comprises:

means for turning each pixel OFF by applying at least one voltage ramp to said top fiber closely spaced wire electrodes to remove the charge at each pixel;

means for selectively adding charge to at least one pixel by applying a voltage to its corresponding closely spaced sustain electrodes in the top fiber and corresponding bottom fiber wire electrode, thereby turning said at least one pixel ON; and means for sustaining the ON pixels by alternatively applying voltage pulses between said far spaced sustain electrode(s) and closely spaced sustain electrodes, thereby creating light in said display.

22. A fiber-based plasma display according to claim 16, wherein said display is addressed in an interlaced mode of operation, where every other line in the display is operated per video frame.

23. A color fiber plasma display device having a plurality of subpixels, comprising:

two glass plates sandwiched around a top fiber array and a bottom fiber array, said top and bottom fiber arrays being substantially orthogonal and defining a structure of said display, said top fiber array disposed on a side facing towards a viewer;

said top fiber array including wire sustain electrodes which are located near a surface of said top fiber on a side facing away from said view and a thin dielectric layer separating said sustain electrodes form said surface, said surface being covered by an emissive film;

said wire sustain electrodes are composed of two closely spaced sustain electrodes separated by at least one far spaced sustain electrode to create each row of subpixels;

said bottom fiber array including three alternating bottom fibers, each bottom fiber including a pair of barrier ribs that define a plasma channel, at least one address electrode located near a surface of said plasma channel, and a phosphor layer coating on said surface of said plasma channel, wherein a luminescent color of said phosphor coating in each of the three alternating bottom fibers represents a subpixel color of said plasma display; and said plasma display being hermetically sealed with a glass frit and said sustain electrodes and said at least one address electrode are brought out through said glass flit for direct connection to a drive control system;

wherein said at least one address electrode is located in a barrier rib region to reduce an addressing distance between the address electrode and the sustain electrodes.

24. A color fiber-based display device according to claim 23, wherein a plasma is initially ignited between said two closely spaced sustain electrodes and pulled through the gap to said far spaced sustain electrode.

25. A color-based plasma display device according to claim 24, wherein said black matrix is formed using a dark glass sealing fit material.

26. A color-based plasma display device according to claim 23, wherein a black matrix function is added to the display between each closely spaced sustain electrode.

27. A color-based plasma display device according to claim 26, wherein said black matrix is formed by coloring said top fiber glass by adding a coloring ingredient into said glass, such as Cobalt.

28. A color-based plasma display device according to claim 23, wherein the surface of said top fiber is contoured around at least one of the sustain electrodes to enhance the electric field from said sustain electrode.

29. A color-based plasma display device according to claim 23, wherein said thin dielectric layer separating said sustain electrodes from said surface is textured around at least one wire electrode to enhance the electric field in said textured region.

30. A color fiber-based plasma display of claim 23, further comprising at least one field electrode located below a plasma channel to retard the electric field created by at least one sustain electrode and to repel said electric field to reside within a plasma cell region.

31. A color fiber-based plasma display of claim 23, wherein said field electrode also serves to shield an electromotive force escaping out of a back of the display.

32. A color fiber-based plasma display of claim 23, wherein a colorant is added to said top fiber creating an absorbing section in said fiber creating a black matrix function.

33. A color fiber-based plasma display of claim 23, further comprising adding at least one field electrode to the said top fiber to retard the electric field created by applying a voltage to said sustain electrodes and confine the electric field to said plasma cell region.

34. A color fiber-based plasma display of claim 33, wherein said field electrode is a transparent conductive film deposited on the surface of said top fiber.

35. A color fiber-based plasma display of claim 23, where the fibers in at least one fiber array is flit sealed together such that the glass plate is not needed to form the vacuum tight seal on the outside surface of said at least one fiber array.

36. A color fiber-based plasma display of claim 23, further comprising adding a transparent conductive film deposited on the surface of at least one said glass plate to assist in confining the electric field from said wire electrodes to said plasma cell region.

37. A color fiber-based plasma display of claim 23, further comprising adding a transparent conductive film deposited on the surface of at least one said glass plate to serves to shield an electromotive force escaping out of the display.

38. A color fiber-based plasma display of claim 23, further comprising adding a glass frit to the top surface of said barrier ribs in at least one said bottom fiber to create a closed plasma cell channel after frit sealing.

39. A color fiber-based plasma display of claim 23, where a plasma is ignited between said closely spaced wire sustain electrodes and then some of the electrons from said plasma are pulled through the long plasma cell region to said at least one other wider spaced wire sustain electrodes to create a long plasma path similar to that experienced in a positive glow region.

40. A color fiber-based plasma display according to claim 23, further comprising an erase address drive control system, wherein said erase address control system comprises:

means for storing charge at each subpixel to turn each subpixel ON;

means for selectively removing said charge from at least one subpixel by applying an erase pulse to its corresponding top fiber closely spaced sustain electrodes and corresponding bottom fiber wire electrode, thereby turning said at least one subpixel OFF; and means for sustaining the ON subpixels by alternatively applying voltage pulses between said far spaced sustain electrode(s) and closely spaced sustain electrodes, thereby creating light in said display.

41. A color fiber-based plasma display according to claim 23, further comprising a ramped voltage address drive control system, wherein said ramped voltage address drive control system comprises:

means for turning each subpixel ON by applying at least one voltage ramp to said top fiber closely spaced wire electrodes to create a standardized charge at each subpixel;

means for selectively removing said charge from at least one subpixel by applying an erase pulse to its corresponding top fiber closely spaced sustain electrodes and corresponding bottom fiber wire electrode, thereby turning said at least one subpixel OFF; and means for sustaining the ON subpixels by alternatively applying voltage pulses between said far spaced sustain electrode(s) and closely spaced sustain electrodes, thereby creating light in said display.

42. A color fiber-based plasma display according to claim 23, further comprising a write address drive control system, wherein said write address control system includes:

means for removing charge at each subpixel, thereby turning each subpixel OFF;

means for selectively adding charge to at least one subpixel by applying a voltage to its corresponding closely spaced sustain electrodes in the top fiber and corresponding bottom fiber wire electrode, thereby turning said at least one subpixel ON; and means for sustaining the ON subpixels by alternatively applying voltage pulses between said far spaced sustain electrode(s) and closely spaced sustain electrodes, thereby creating light in said display.

43. A color fiber-based plasma display according to claim 23, further comprising a ramped voltage address drive control system, wherein said ramped voltage address drive control system comprises:

means for turning each subpixel OFF by applying at least one voltage ramp to said top fiber closely spaced wire electrodes to remove the charge at each subpixel;

means for selectively adding charge to at least one subpixel by applying a voltage to its corresponding closely spaced sustain electrodes in the top fiber and corresponding bottom fiber wire electrode, thereby turning said at least one subpixel ON; and means for sustaining the ON subpixels by alternatively applying voltage pulses between said far spaced sustain electrode(s) and closely spaced sustain electrodes, thereby creating light in said display.

44. A color fiber-based plasma display according to claim 23, wherein said display is addressed in an interlaced mode of operation, where every other line in the display is operated per video frame.

45. A fiber-based plasma display comprising:
a) at least one complicated-shaped fiber forming at least one plasma channel; and
b) at least one wire address electrode located within at least one barrier rib wall that forms said plasma channel to reduce an addressing distance between said address electrode and at least one sustain electrode.

* * * * *

UNITED STATES PATENT AND TRADEMARK OFFICE
CERTIFICATE OF CORRECTION

PATENT NO. : 6,771,234 B2  Page 1 of 1
DATED : August 3, 2004
INVENTOR(S) : Chad Byron Moore It is certified that error appears in the above-identified patent and that said Letters Patent is hereby corrected as shown below:

<u>Column 13,</u>
Line 27, replace "flit" with -- frit --.
Line 39, replace "fit" with -- frit --.

<u>Column 14,</u>
Line 10, replace "flit" with -- frit --.

Signed and Sealed this

Ninth Day of May, 2006

JON W. DUDAS
*Director of the United States Patent and Trademark Office*